United States Patent [19]

Messinger

[11] 3,771,842
[45] Nov. 13, 1973

[54] SHAVER CONSTRUCTION
[75] Inventor: Werner Messinger, Kronberg/TS, Germany
[73] Assignee: Braun Aktiengesellschaft, Frankfurt am Main, Germany
[22] Filed: Apr. 16, 1971
[21] Appl. No.: 134,681

[30] Foreign Application Priority Data
Apr. 23, 1970 Germany............... P 20 19 745.9

[52] U.S. Cl............ 30/43.92, 30/346.51, 30/346.58, 30/346.6
[51] Int. Cl.................... B26b 19/10, B26b 19/04
[58] Field of Search................ 30/43.91, 43.92, 30/346.51, 346.58, 346.59, 346.6

[56] References Cited
UNITED STATES PATENTS 3,319,333  5/1967  Futterer ........................... 30/43.92
3,332,146  7/1967  Kratz ................................ 30/43.92
3,561,118  2/1971  Antretter ...................... 30/43.91 X
3,643,330  2/1972  Brown ........................... 30/346.51
3,376,642  4/1968  Liska ............................. 30/346.51

Primary Examiner—Othell M. Simpson
Assistant Examiner—Gary L. Smith
Attorney—Michael Striker

[57] ABSTRACT

A plurality of cutter blades are mounted on a cutter blade mounting member which is elongated and reciprocable in the direction of its elongation. At least one transversely extending reinforcing wall is provided intermediate the opposite longitudinal ends of the cutter blade mounting member and extends transversely to the direction of reciprocation thereof. The reinforcing wall includes a coupling portion for engagement with an auxiliary component of the shaver which imparts reciprocatory movement to the cutter blade mounting member.

3 Claims, 2 Drawing Figures

Inventor
WERNER MESSINGER

SHAVER CONSTRUCTION

BACKGROUND OF THE INVENTION

The present invention relates generally to a shaver construction, and more particularly, to an improved cutting or shear head for dry shavers.

It is well known that many dry shavers utilize a shear head composed essentially of an elongated cutter blade mounting member on which a plurality of cutter blades are mounted. These shear heads are reciprocated whereby the cutter blades then effect shaving of the beard of a user. It is already known to make the cutter blade mounting member of metal, as well as to make it —as an alternative—of synthetic plastic material. Quite frequently the synthetic plastic material is filled or reinforced with glass fibers and of course the use of synthetic plastic material instead of metallic material is intended to reduce the oscillating masses of the shear head and the inertial forces which are involved.

The problem with using synthetic plastic material for the cutter blade mounting members is that for the most part these materials have lower strength characteristics than metal, given that members made of the two materials are identical in size and configuration. In particular, and again given identical dimensioning, components made of synthetic plastic material are as a rule of lower bending resistance and have a lower resistance to twisting than identical objects made of metallic material. This has resulted in encountering certain difficulties when making the cutter blade mounting members of synthetic plastic instead of metal.

A further consideration in the cutter construction of the cutter blade mounting members is how to connect them in a simple manner with the drive-imparting component of the shaver, that is the component which effects oscillatory motion of the shear head. Evidently, such a connection should be as simple as possible in order to facilitate improved and lower-cost mass production of the parts in question.

SUMMARY OF THE INVENTION

It is, accordingly, an object of the present invention to overcome the aforementioned disadvantages.

More particularly, it is an object of the present invention to provide an improved dry shaver construction, and especially an improved shear head in a dry shaver.

Still more specifically it is an object of the present invention to provide an improved cutter blade mounting member which is composed of synthetic plastic material but has higher mechanical strength than was heretofore available, and which also can be readily connected with the drive component of the dry shave.

In pursuance of the above objects, and of others which will become apparent hereinafter, one feature of the invention resides in a shaver which, briefly stated, comprises a plurality of cutter blades and a cutter blade mounting member mounting the cutter blades and being elongated and reciprocable in the direction of its elongation. At least one transversely extending reinforcing wall is provided intermediate the opposite longitudinal ends of the cutter blade mounting member and extends transversely to the aforementioned direction. It includes a coupling portion for engagement with an auxiliary component of the shaver which imparts reciprocatory motion to the cutter blade mounting member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
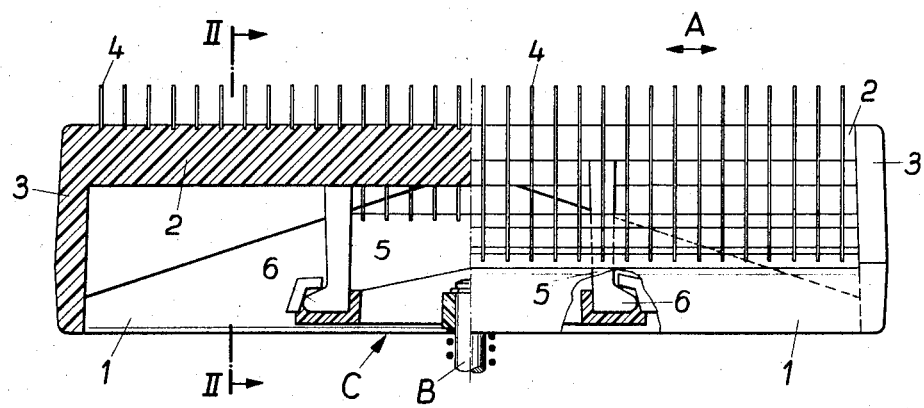
FIG. 1 is a somewhat diagrammatic longitudinal sectional elevation showing an embodiment of the invention.
Figure 2:
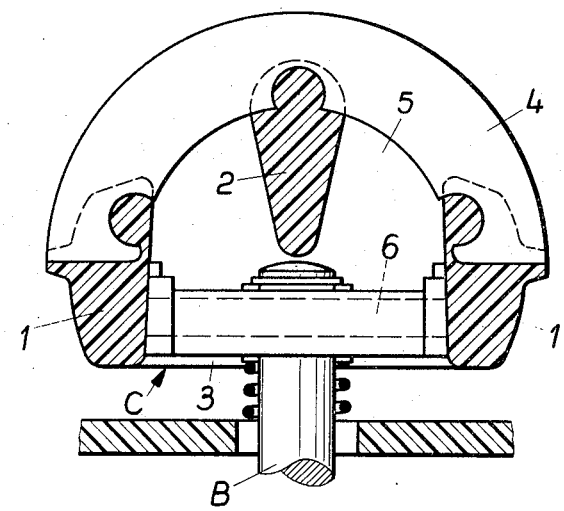
FIG. 2 is a transverse section through FIG. 1.

Discussing now the drawing in detail it will be seen that the cutter blade mounting member is elongated and essentially comprises two lateral longitudinally extending portions 1, an upper longitudinally extending portion 2, and two transversely extending end walls 3 which connect the portions 1 and 2. It is thus hollow and of substantially semi-cylindrical configuration as the cross-section in FIG. 2 shows. The drawing illustrates how the cutter blades 4 —of which a plurality is provided— are connected to the mounting member, straddling the upper surface of the latter.

The component C indicates diagrammatically the auxiliary drive component which is engaged with the cutter blade mounting member in order to reciprocate the latter in the longitudinal direction thereof, that is in the direction of the arrow A. How this reciprocation is effected, and how the illustrated components fit into the overall organization of a known dry shaver, are considerations which are already known to those skilled in the art and therefore require no detailed description. U.S. Pat. Nos. 3,521,093 and 3,319,333.

Substantially midway of the elongation of the cutter blade mounting member are provided two transversely extending reinforcing walls 5 which extend transversely to the direction of reciprocation A and one connected (or of one piece) with the portions 1 and 2. The lower free end of each of the walls 5 has an edge portion from which there projects a rib 6 which is couplingly engaged with the aforementioned auxiliary component C of the swinging arm B of the dry shaver which effects the oscillatory or reciprocatory movement of the shear head.

The mounting member composed of the portions 1, 2, 3, 5 and 6 may be made of a suitable synthetic plastic material, which in accordance with already well known practice may be filled or reinforced with glass fibers.

In this manner I obtain a cutter blade mounting member which to distributes the forces to be transmitted that no excessively high mechanical stresses can occur anywhere in the cutter blade mounting member. The transversely extending reinforcing walls 5 so reinforce the mounting member that no twisting or other deformation thereof will take place, so that the mounting member achieves the aforementioned object of having greater mechanical strength than was heretofore the case in such mounting members of synthetic plastic material. At the same time the unitary rib 6 which serves for coupling the cutter blade mounting member with the drive components B and C of the non-illustrated dry shaver motor, permits such coupling in a simple and inexpensive manner, thereby achieving another object of the invention, namely to reduce the expenses involved in a dry shaver construction.

It will be understood that each of the elements described above, or two or more together, may also find a useful application in other types of constructions differing from the types described above.

While the invention has been illustrated and described as embodied in a dry shaver construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a shaver, in combination, a plurality of cutter blades; a cutter blade mounting member of synthetic plastic material mounting said cutter blades, said mounting member being of hollow, semi-cylindrical cross-section and having two opposite side wall parts and a top wall part, said mounting member further having an open side and being reciprocable in the direction of its elongation; at least one transversely extending reinforcing wall portion of substantially semi-circular outline provided intermediate the opposite longitudinal ends of said cutter blade mounting member and being unitary with all of said wall parts, said wall portion extending transversely to said direction across the hollow of said mounting member to the region of said open side and having there a free edge; and a coupling portion projecting from said free edge in direction of elongation of said mounting member for engagement with an auxiliary component of said shaver which imparts reciprocatory motion to said blade mounting member.

2. In a shaver as defined in claim 1, wherein said synthetic plastic material is fiber-reinforced.

3. In a shaver as defined in claim 1, further comprising at least one additional reinforcing wall portion similar to the first-mentioned reinforcing wall portion, said wall portions being spaced from one another in direction of elongation of said mounting member.

* * * * *